US012752813B2

(12) United States Patent
Szczerba et al.

(10) Patent No.: US 12,752,813 B2
(45) Date of Patent: Oct. 6, 2026

(54) DRIVER COGNITIVE DISTRACTION DETECTOR AND MITIGATION SYSTEM AND METHOD

(71) Applicant: GM Global Technology Operations LLC, Detroit, MI (US)

(72) Inventors: Joseph F. Szczerba, Grand Blanc, MI (US); Sri Krishna Divya Pemmaraju, Royal Oak, MI (US); Daniel S. Glaser, Novi, MI (US); Yi Guo Glaser, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 54 days.

(21) Appl. No.: 19/073,412

(22) Filed: Mar. 7, 2025

(65) Prior Publication Data

US 2026/0264712 A1 Sep. 10, 2026

(51) Int. Cl.

| | |
|---|---|
| ***G08B 23/00*** | (2006.01) |
| ***B60W 40/09*** | (2012.01) |
| ***B60W 50/16*** | (2020.01) |
| ***G06V 20/59*** | (2022.01) |
| ***G06V 40/18*** | (2022.01) |
| *B60W 40/08* | (2012.01) |

(Continued)

(52) U.S. Cl.

CPC ............ *B60W 50/16* (2013.01); *B60W 40/09* (2013.01); *G06V 20/597* (2022.01); *G06V 40/18* (2022.01); *B60W 2040/0818* (2013.01); *B60W 2040/0872* (2013.01); *B60W 2050/0083* (2013.01); *B60W 2050/143* (2013.01); *B60W 2050/146* (2013.01); *B60W 2420/403* (2013.01); *B60W 2520/105* (2013.01); *B60W 2540/221* (2020.02); *B60W 2540/225* (2020.02); *B60W 2540/229* (2020.02)

(58) Field of Classification Search

CPC ................. B60W 50/16; B60W 40/09; B60W 2040/0818; B60W 2040/0872; B60W 2050/0083; B60W 2050/143; B60W 2050/146; B60W 2420/403; B60W 2520/105; B60W 2540/221; B60W 2540/225; B60W 2540/229; G06V 20/597; G06V 40/18

USPC .......... 340/576, 575, 573.1, 573.7, 439, 438

See application file for complete search history.

(56) References Cited

U.S. PATENT DOCUMENTS

2020/0057487 A1* 2/2020 Sicconi ................... G06F 3/011
2022/0063607 A1* 3/2022 Daniel .................. B60W 10/04

(Continued)

*Primary Examiner* — Anh V La
(74) *Attorney, Agent, or Firm* — Vivacqua Crane, PLLC

(57) ABSTRACT

A cognitive distraction detection system for a driver of a vehicle and method is provided. The system includes a camera, a human machine interface (HMI), and a controller, which further includes a processor and a memory. The processor is programmed to receive from the driver a cognitive distraction threshold preference; determine whether physical traits of the driver indicate cognitive distraction; determine whether physiological traits of the driver indicate cognitive distraction; receive an indication of at least one vehicle dynamic of the vehicle; determine whether driving behavior indicates cognitive distraction of the driver; determine a driver cognitive distraction level; send an indication of the driver cognitive distraction to a human machine interface (HMI) of the vehicle; and create an alert to the driver using the human machine interface (HMI).

20 Claims, 6 Drawing Sheets

(51) Int. Cl.
*B60W 50/00* (2006.01)
*B60W 50/14* (2020.01)

(56) References Cited

U.S. PATENT DOCUMENTS

2025/0100348 A1* 3/2025 Jafri .................... G06V 20/597
2025/0353522 A1* 11/2025 Gupta ................ B60W 60/001

* cited by examiner

DRIVER COGNITIVE DISTRACTION DETECTOR AND MITIGATION SYSTEM AND METHOD

INTRODUCTION

The present disclosure relates to vehicle safety systems and methods, and more particularly, to a system and method designed to detect cognitive driving distractions for enhancing driver safety and reducing the risk of accidents.

Distracted driving is a significant contributor to road accidents and fatalities worldwide. Distractions can be categorized into three main types: visual, manual, and cognitive. Cognitive distractions occur when a driver's mental focus is diverted from the primary task of driving, which can include activities such as talking on a phone, daydreaming, or engaging in complex thought processes. Unlike visual and manual distractions, cognitive distractions are more challenging to detect and mitigate because they do not involve observable physical actions.

Several technologies have been proposed to monitor cognitive distractions, including the use of facial recognition, voice analysis, and physiological sensors. These technologies aim to provide real-time feedback and alerts to drivers, thereby enhancing road safety.

While these cognitive distraction prevention systems can monitor cognitive distractions, there is a need in the art for a cognitive distraction prevention and mitigation system that can seamlessly integrate with existing vehicle systems to detect and mitigate cognitive driving distractions.

SUMMARY

According to several aspects of the present disclosure, a cognitive distraction detection system for a driver of a vehicle is provided. The cognitive distraction detection system includes a camera, a human machine interface (HMI), and a controller in electrical communication with the camera and the human machine interface (HMI). The controller includes a processor and a memory. The memory includes instructions such that the processor is programmed to receive from the driver a cognitive distraction threshold preference; determine whether physical traits of the driver indicate cognitive distraction at least partially based on the cognitive distraction threshold preference; determine whether physiological traits of the driver indicate cognitive distraction at least partially based on the at least one cognitive distraction threshold preference; and receive an indication of at least one vehicle dynamic of the vehicle. The processor is also programmed to determine whether driving behavior indicates cognitive distraction of the driver; determine a driver cognitive distraction level based on at least the physical traits, the physiological traits, and the driving behavior; send an indication of the driver cognitive distraction to a human machine interface (HMI) of the vehicle using the controller when driver cognitive distraction has been determined; and create an alert to the driver using the human machine interface (HMI).

In accordance with another aspect of the disclosure, the at least one cognitive distraction threshold preference includes at least one of frequency of an amount of lane line touches, an amount of time being tailgated, an amount of time maintaining a speed lower than surrounding traffic, or an amount of low distribution of eye gaze patterns.

In accordance with another aspect of the disclosure, the at least one vehicle dynamic includes at least one of vehicle speed, vehicle acceleration, a braking pattern, or a vehicle steering pattern.

In accordance with another aspect of the disclosure, the alert includes an inflatable element on at least one of a head up display, an instrument cluster, an infotainment system, or a passenger display.

In accordance with another aspect of the disclosure, the alert includes an inflatable element that is a bubble that gradually increases in size.

In accordance with another aspect of the disclosure, the alert includes at least one of an audio or a haptic alert that accompanies an inflatable element.

According to several aspects of the present disclosure, a method for detecting and mitigating cognitive distraction of a driver of a vehicle is provided. The method includes receiving from a driver, using a controller, a cognitive distraction threshold preference; determining, using the controller, whether at least one physical trait of the driver indicates cognitive distraction at least partially based on the cognitive distraction threshold preference; determining, using the controller, whether at least one physiological trait of the driver indicates cognitive distraction at least partially based on the at least one cognitive distraction threshold preference; and receiving an indication of at least one vehicle dynamic of the vehicle. The method also includes determining whether driving behavior suggests cognitive distraction of the driver; determining a driver cognitive distraction level based on at least the physical traits, the physiological traits, and the driving behavior; sending an indication of the driver cognitive distraction to a human machine interface of the vehicle using the controller when driver cognitive distraction has been determined; and creating an alert to the driver using the human machine interface.

In accordance with another aspect of the disclosure, the at least one cognitive distraction threshold preference includes at least one of frequency of an amount of lane line touches, an amount of time being tailgated, an amount of time maintaining a speed lower than surrounding traffic, or an amount of low distribution of eye gaze patterns.

In accordance with another aspect of the disclosure, the at least one vehicle dynamic includes at least one of vehicle speed, vehicle acceleration, a braking pattern, or a vehicle steering pattern.

In accordance with another aspect of the disclosure, the at least one vehicle dynamic includes an Advanced Driver Assistance Systems (ADAS) measurement.

In accordance with another aspect of the disclosure, the alert includes at least one of an audio or a haptic alert.

In accordance with another aspect of the disclosure, determining a driver cognitive distraction level includes receiving driver and vehicle information; determining a cognitive distraction characteristic based at least partially on at least one of the physical traits, the physiological traits, or the vehicle dynamics; determining whether the cognitive distraction characteristic exceeds the cognitive distraction threshold preference; when the cognitive distraction characteristic exceeds the cognitive distraction threshold preference, determining a variable weighting factor for the cognitive distraction characteristic; assigning a cognitive distraction score to the cognitive distraction characteristic; and presenting the cognitive distraction score to the controller.

In accordance with another aspect of the disclosure, the cognitive distraction characteristic includes at least one of a frequency of lane line touches, a time being tailgated, a time maintaining a speed lower than surrounding traffic, or a low distribution of eye gaze patterns.

In accordance with another aspect of the disclosure, determining a variable weighting factor includes using a lookup table.

In accordance with another aspect of the disclosure, creating the alert to the driver using the human machine interface includes creating an inflatable element on at least one of a heads-up display, an instrument cluster, an infotainment system, or a passenger display.

In accordance with another aspect of the disclosure, the inflatable element includes a bubble that gradually increases in size.

In accordance with another aspect of the disclosure, creating the inflatable element includes providing at least one of an audio or a haptic alert that accompanies the inflatable element.

In accordance with another aspect of the disclosure, creating the alert to the driver includes creating an inflatable element that changes as cognitive distraction time increases.

In accordance with another aspect of the disclosure, the inflatable element at least one of increases in size, increases in number of inflatable elements, moves from an edge to a center of the human machine interface (HMI), or shakes and pulses.

According to several aspects of the present disclosure, a system for detecting cognitive distraction of a driver of a vehicle is provided. The system includes a camera, a biometric sensor, a human machine interface, and a controller in electrical communication with the camera, the biometric sensor, and the human machine interface. The controller includes a processor and a memory. The memory includes instructions such that the processor is programmed to receive from a driver a cognitive distraction threshold preference; determine whether physical traits of the driver indicate cognitive distraction at least partially based on the cognitive distraction threshold preference; determine whether physiological traits of the driver indicate cognitive distraction at least partially based on the at least one cognitive distraction threshold preference; and receive an indication of at least one vehicle dynamic of the vehicle. The processor is also programmed to determine whether driving behavior indicates cognitive distraction of the driver; determine a driver cognitive distraction level based on at least the physical traits, the physiological traits, and the driving behavior; send an indication of the driver cognitive distraction to a human machine interface of the vehicle using the controller when driver cognitive distraction has been determined; and create an alert to the driver using the human machine interface, wherein the alert includes an inflatable element.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
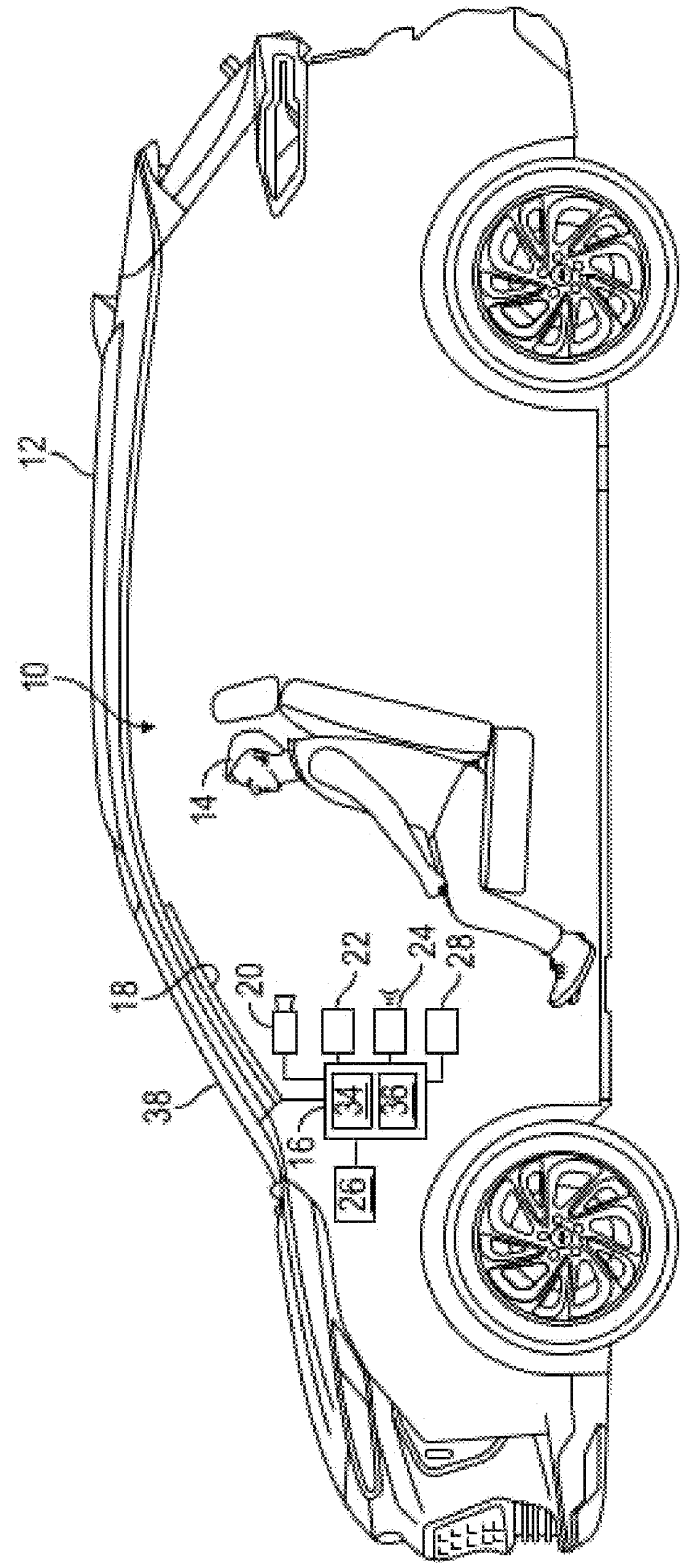
FIG. 1 is a schematic diagram of a vehicle driver cognitive distraction detection system in a vehicle, in accordance with the present disclosure.

The following description is merely exemplary in nature and is not intended to limit the present disclosure, application, or uses. Furthermore, there is no intention to be bound by any expressed or implied theory presented in the preceding introduction, summary, or the following detailed description. It should be understood that throughout the drawings, corresponding reference numerals indicate like or corresponding parts and features.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale.

Referring to FIG. 1, a cognitive distraction detection system 10 is illustrated. The cognitive distraction detection system 10 is shown with an exemplary vehicle 12. While a passenger vehicle is illustrated, it should be appreciated that the vehicle 12 may be any type of vehicle or equipment without departing from the scope of the present disclosure. The cognitive distraction detection system 10 is used to detect cognitive distraction of a driver 14 (or "user" or "operator") of the vehicle 12 in order to determine drowsy or distracted driving, as will be described in greater detail below. The cognitive distraction detection system 10 generally includes a controller 16, a display 18, a camera 20, a biometric sensor 22, an audio system 24, a cognitive distraction driver monitoring system 26, and a human machine interface (HMI) 28.

The controller 16 is used to implement a method 100 for detecting and mitigating cognitive distraction of a driver 14 (or operator or occupant) of the vehicle 12, as will be described below. The controller 16 includes at least one processor 34 and a non-transitory computer readable storage device or media 36. The processor 34 may be a custom made or commercially available processor, a central processing unit (CPU), a graphics processing unit (GPU), an auxiliary processor among several processors associated with the controller 16, a semiconductor-based microprocessor (in the form of a microchip or chip set), a macroprocessor, a combination thereof, or generally a device for executing instructions. The computer readable storage device or media 36 may include volatile and nonvolatile storage in read-only memory (ROM), random-access memory (RAM), and keep-alive memory (KAM), for example. KAM is a persistent or non-volatile memory that may be used to store various operating variables while the processor 34 is powered down.

The computer-readable storage device or media 36 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the controller 16 to control various systems of the vehicle 12.

The controller 16 may also consist of multiple controllers which are in electrical communication with each other. The controller 16 may be inter-connected with additional systems and/or controllers of the vehicle 12, allowing the controller 16 to access data such as, for example, speed, acceleration, braking, location of other vehicles relative to vehicle 12, current speed limits, and/or steering angle of the vehicle 12. The controller 16 is in electrical communication with the display 18, the camera 20, the audio system 24, the driver monitoring system 26, and the human machine interface (HMI) 28.

In an exemplary embodiment, the electrical communication is established using, for example, a CAN bus, a Wi-Fi network, a cellular data network, or the like. It should be understood that various additional wired and wireless techniques and communication protocols for communicating with the controller 16 are within the scope of the present disclosure.

The display 18 may be used to provide an alert or otherwise communicate information during the method for detecting and mitigating cognitive distraction of the driver 14 (or operator or occupant) of the vehicle 12. In some instances, the display 18 may be part of the HMI 28. While the display 18 is shown in FIG. 1 proximate a windshield 38 of the vehicle 12, the display 18 may include other configurations and/or locations. For example, the display 18 and/or the HMI 28 may include or be a part of an instrument cluster, a passenger display, and/or an infotainment system. The display 18 may be a wide view display such as, for example, a wide-view display on a console of the vehicle 12, a full windshield head up display (HUD) on the windshield 38 of the vehicle 12, a wide-view reflective or diffractive HUD (e.g., such as a pillar-to-pillar display) on the windshield 38 of the vehicle 12, or any other type of wide-view display. In an exemplary embodiment, the HUD is configured to provide information to the occupant by projecting text, graphics, and/or images upon the windshield 38 of the vehicle 12. In a non-limiting example, the HUD includes a projector (not shown) which is used by the controller 16 to project the text, graphics, and/or images upon the windshield 38 of the vehicle 12. The text, graphics, and/or images are reflected by the windshield 38 of the vehicle 12 and are visible to the driver 14 or occupant without looking away from a roadway ahead of the vehicle 12. It should be understood that various types of head-up display devices, including, for example, augmented reality head-up display (AR-HUD) devices are within the scope of the present disclosure. In an exemplary embodiment, the occupant may interact with the HUD using a human-interface device (HID), including, for example, a touchscreen, an electromechanical switch, a capacitive switch, a rotary knob, a microphone for receiving voice commands, and the like. It should be understood that additional systems for displaying information to the occupant of the vehicle 12 are also within the scope of the present disclosure. The HUD is in electrical communication with the HMI 28 and/or controller 16 as discussed above.

The camera 20 can be used to assess and classify a driver state based on an eye gaze pattern, an eye location, an eye state, a driver posture, a head orientation, and/or other characteristics of the driver 14. The camera 20 may be mounted within the vehicle 12 forward of the driver 14, overhead the driver 14, and/or positioned in a location having a clear view of the driver 14. The camera 20 may include any type of in-vehicle camera and may include various lens types including, for example, wide-angle lenses and/or narrow-angle lenses, and/or infrared light emitting diode (LED) lighting to induce corneal reflection, thus improving camera perception in low lighting conditions. The camera 20 may also use infrared (IR) light to illuminate the driver's whole face to perceive behavioral based driver actions along with head position of the driver 14.

The biometric sensor 22 is used to determine a physiologic measurement of the driver 14. For example, the biometric sensor 22 may include a heart rate sensor, a temperature sensor (e.g., infrared), a respiratory sensor, and/or a perspiration sensor. It is appreciated that various other types of biometric sensors 22 may be employed without departing from the scope of the present disclosure.

The audio system 24 can be used to provide alerts to the driver 14 when detecting or determining cognitive distraction during the method 100 for detecting and mitigating cognitive distraction of the driver 14. The audio system 24 can include one or more speakers located within the vehicle 12 and may also include one or more microphones.

The driver monitoring system 26 is used to monitor the driver 14 during operation of the vehicle 12. The driver monitoring system 26 uses the camera 20, as well as additional sensors (e.g., biometric sensor 22), to collect information regarding the driver 14. The driver monitoring system 26 may use the display 18, as well as the audio system 24, to provide feedback to the driver 14 based on the collected information. For example, the driver monitoring system 26 may track an attentiveness of the driver 14 using the camera 20 and provide an auditory alert from the audio system 24, which may be in combination with a visual alert (e.g., on the display 18 and/or HMI 28) and/or a haptic alert) if the driver monitoring system 26 determines that the driver 14 is cognitively distracted, inattentive, and/or sleepy.

The human machine interface (HMI) 28 is used to provide information to the driver 14, operator, and/or occupant of the vehicle 12 and also to provide information from the driver 14 to the controller 16 and/or the vehicle 12. In the scope of the present disclosure, the occupant includes the driver and/or a passenger of the vehicle 12. In an example, the HMI 28 is or includes the display 18 (e.g., part of an infotainment system of the vehicle 12) located in view of the driver 14 and capable of displaying text, graphics and/or images. It is to be understood that HMI display systems including LCD displays, LED displays, and the like are within the scope of the present disclosure. Other examples, such as where the HMI 28 is disposed in a rearview mirror, are also within the scope of the present disclosure. The HMI 28 may also include haptic seats, haptic steering or steering wheel, and/or audio chimes. In an exemplary embodiment, the occupant may interact with the HMI 28 using a human-interface device (HID), including, for example, a touchscreen, an electromechanical switch, a capacitive switch, a rotary knob, a microphone for receiving voice commands, and the like. It should be understood that additional systems for displaying information to the occupant of the vehicle 12 are also within the scope of the present disclosure. The HMI 28 is in electrical communication with the controller 16 as discussed above.

The cognitive distraction detection system 10 is used to detect and assess driver cognitive distraction. A driver 14 with cognitive distraction involves a driver that is distracted or diverted from the task of driving. Cognitive distraction may happen even if a driver's eyes are on the road and hands are on the steering wheel. Some examples of driver cognitive distraction may include talking on a hands-free phone, daydreaming, thinking about personal problems, feeling sleepy or groggy, and/or engaging in deep conversations with vehicle passengers. A cognitive distraction can impair the driver's reaction time and decision-making abilities making it harder to respond to sudden changes in traffic conditions. Cognitive distraction may be difficult to detect because the risk of cognitive distraction may not be obvious to the driver 14 and acceptance of a warning by the driver may be low. The cognitive distraction detection system 10 is configured to communicate with the driver in a manner that is "gentle" or "whimsical" yet accurate enough to alert the driver of cognitive distraction.

Figure 2:
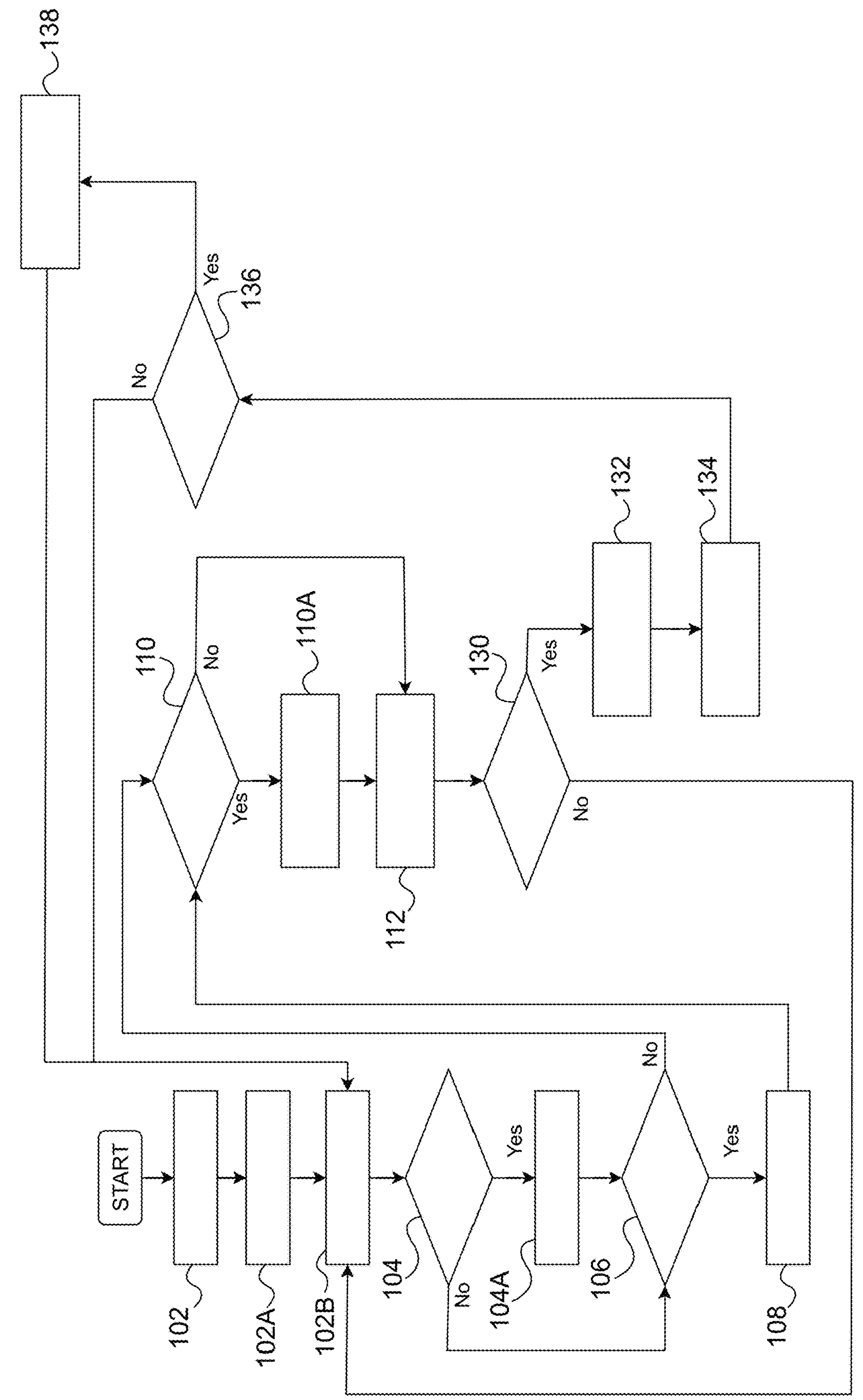
FIG. 2 is a flowchart illustrating a method for detecting and mitigating cognitive distraction of a driver of a vehicle, in accordance with the present disclosure.

Turning to FIG. 2, the method 100 for detecting cognitive distraction of the driver 14 of the vehicle 12 is shown. The method 100 begins at step 102 when the driver 14 enters the vehicle 12 and inputs, via the HMI 28 or other input device, a cognitive distraction threshold preference. The controller 16 can receive the cognitive distraction threshold preference, which may include driving behaviors that the driver 14 has expressed a desire to not demonstrate at a specific level. Some examples of a cognitive distraction threshold preference may include an amount of time tailgating another vehicle, an amount of time traveling maintaining a significantly slower speed than surrounding traffic, and/or a number or frequency of lane lines touched or crossed. Step 102A then depicts the driver 14 operating the vehicle 12, and step 102B depicts the controller 16 and the cognitive distraction detection system 10 monitoring the driver 14 or operator using, for example, the camera 20, the biometric sensor 22, and/or other vehicle sensors. The method 100 then proceeds to step 104.

Step 104 depicts determining, using the controller 16, whether at least one physical trait of the driver 14 indicates cognitive distraction at least partially based on the cognitive distraction preference inputted at step 102. The camera 20 and/or biometric sensor 22 may be used to detect and communicate to the controller 16 an indication of the at least one physical trait. Some examples of physical traits of the driver 14 may include eye gaze and tracking, an eye blink pattern, an eye opening size and/or eye squinting, pupil size, driver response time to alerts and navigation, vehicle button presses by the driver 14, and/or driver behavior, movements, and postures. Step 104A depicts receiving, using the controller 16, a determination of an indication of cognitive distraction determined at step 104. The method 100 then proceeds to step 106.

Step 106 depicts determining, using the controller 16, whether at least one physiological trait of the driver 14 indicates cognitive distraction at least partially based on the cognitive distraction preference inputted at step 102. The camera 20 and/or biometric sensor 22 may be used to detect and communicate to the controller 16 an indication of the at least one physiological trait. Some examples of a physiological trait may include an emotional state (e.g., anger, happiness, and the like) of the driver or a biometric characteristic of the driver 14 (e.g., heart rate, temperature, respiratory, perspiration, and the like). Step 106A depicts receiving, using controller 16, a determination of an indication of or information regarding cognitive distraction determined at step 106. The method 100 then proceeds to step 108.

Step 108 depicts receiving an indication of at least one vehicle dynamic of the vehicle 12. For example, the controller 16 can receive from one or more vehicle sensors information including vehicle speed, vehicle acceleration, a braking pattern, a vehicle steering pattern, Advanced Driver Assistance Systems (ADAS) information (e.g., adaptive cruise control, lane departure occurrences, lane centering, lane keeping assists, automatic emergency braking), and the like. Method 100 then proceeds to step 110.

Step 110 depicts determining whether driving behavior suggests a cognitive distraction of the driver 14. The controller 16 can determine, using predetermined information (e.g., information inputted at step 102), whether a specific threshold has been exceeded. For example, if the driver 14 entered a specific number of lane departure occurrences as a threshold (e.g., at step 102), and the vehicle 12 and/or driver 14 has exceeded the specific number of lane departure occurrences, then the controller 16 determines that driving behavior of the driver 14 suggests cognitive distraction of the driver 14. Step 110A depicts receiving, using the controller 16, a determination of an indication of cognitive distraction based on driving behavior determined at step 110. The method 100 then proceeds to step 112.

Step 112 depicts determining a driver cognitive distraction level based on at least the physical traits determined in step 104, the physiological traits determined in step 106, and the driving behavior determined in step 110.

Figure 3:
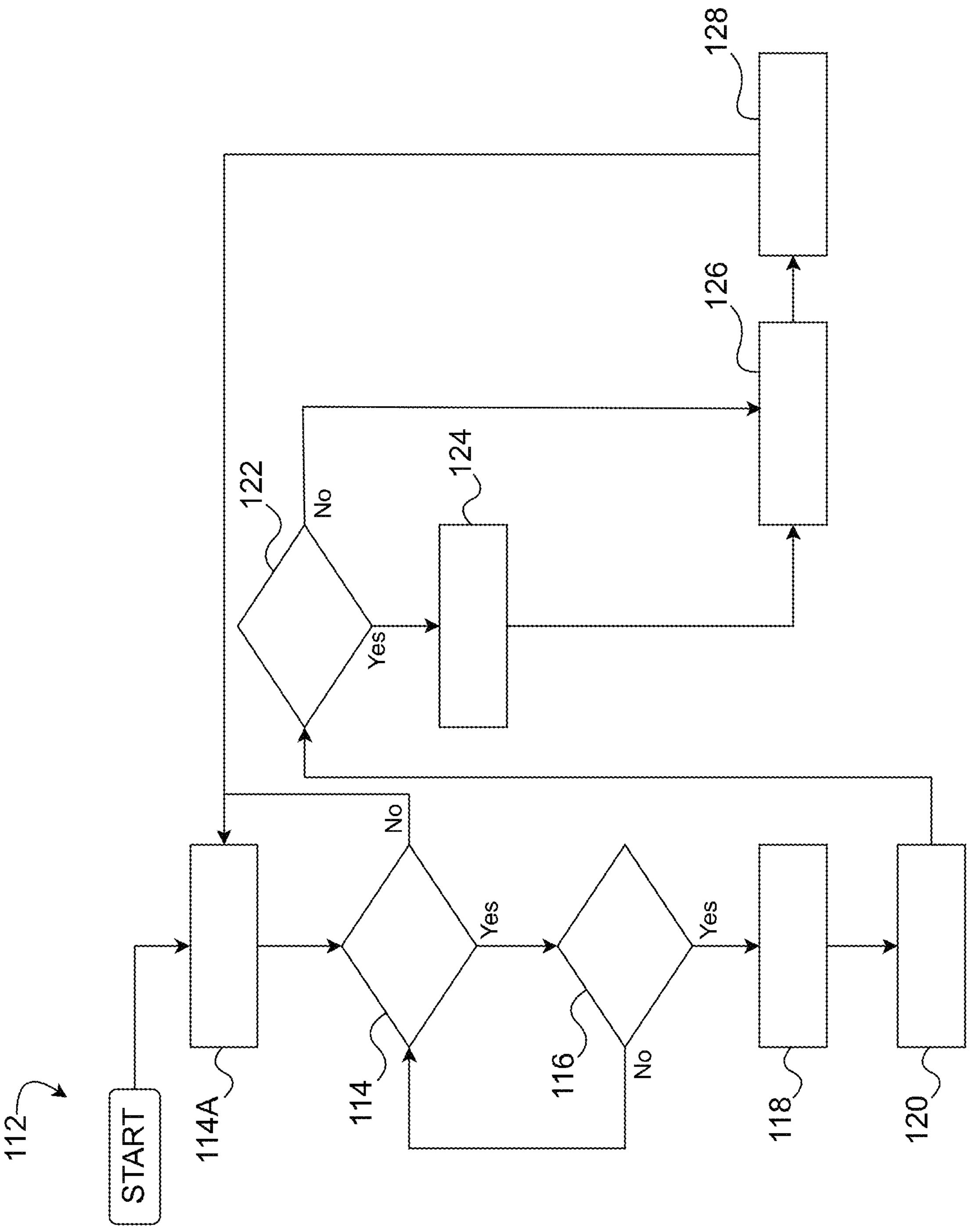
FIG. 3 is a flowchart illustrating a method for the step of determining a driver cognitive distraction level, in accordance with the present disclosure.

FIG. 3 further illustrates step 112 of determining a driver cognitive distraction level by the controller 16. In FIG. 3, step 114A depicts receiving user (e.g., driver 14) and vehicle (e.g., from vehicle 12) information from at least one vehicle sensor (e.g., biometric sensor 22). Step 114 depicts determining a cognitive distraction characteristic based at least partially on the physical traits, the physiological traits, and/or the vehicle dynamics received in steps 104, 106, and/or 110, respectively. If a cognitive distraction characteristic is determined at step 114 (e.g., a presence of a physical trait, a physiological trait, and/or a suggestion of cognitive distraction), the method then moves to step 116, which depicts determining whether the cognitive distraction characteristic exceeds the cognitive distraction threshold preference. Some examples of a cognitive distraction characteristic include a frequency or amount of lane line touches, an amount of time being tailgated, an occurrence or an amount of time with a significantly lower vehicle speed relative to surrounding traffic, and/or a low distribution or amount of eye gaze patterns.

If a cognitive distraction characteristic is determined at step 116, then method 100 moves to step 118 depicting, using controller 16, characterizing the driver cognitive distraction. Step 120 depicts, using controller 16, determining a variable weighting factor for the cognitive distraction characteristic. The variable weighting factor is determined using, for example, a lookup table containing weighting factors pre-correlated with cognitive distraction characteristics.

Still referring to FIG. 3, step 122 depicts determining if other driver cognitive distraction characteristics are present using controller 16. If other driver cognitive distraction characteristics are determined to be present, then method 100 moves to step 124, which depicts assigning a cognitive distraction score to the determined cognitive distraction characteristic using controller 16. The cognitive distraction score may be determined using predetermined values, for example in a database or a lookup table. In some instances, there may be multiple cognitive distractions determined and/or characterized, and the controller 16 may apply a variable weighting factor from the lookup table to each respective cognitive distraction characteristic, respectively.

Still referring to FIG. 3, step 126 depicts compiling a cognitive distraction score, for example from one or multiple cognitive distraction scores determined in step 124, which is performed by the controller 16. At step 128, the controller 16 then delivers the compiled cognitive distraction score to the HMI 28 or other device. If needed, method 100 can then iteratively return to step 114A where the compiled cognitive distraction score may be inputted to the controller 16 as driver and/or vehicle information.

Referring again to FIG. 2, and once a driver cognitive distraction level has been determined at step 112, then method 100 proceeds to step 130, which depicts determining whether cognitive distraction of the driver has occurred or increased. If driver cognitive distraction has not occurred or increased, then the controller 16 and/or system may continue to monitor the driver 14 at step 102B. If the controller 16 has determined that driver cognitive distraction has occurred, method 100 moves to step 132, which depicts sending an indication of the driver cognitive distraction to the HMI 28 of the vehicle 12 using the controller 16. Step 134 depicts using the controller 16 to create an alert to the driver 14 using the HMI 28. As depicted in step 136, the controller 16 may determine, for example using the camera 20 and/or the biometric sensor 22 in the vehicle 12, whether the driver 14 becomes attentive to the alert on the HMI 28. If the driver 14 is determined as not attentive to the alert, then the controller 16 may use the inattentiveness as input at step 102B. If the driver 14 is determined as attentive to the alert, then the controller can extinguish the alert on the HMI 28 as shown at step 138 and use the attentiveness and occurrence of the extinguished alert as input at step 102B.

The alert (or alerts) created by the controller 16 and presented to the driver 14 by the HMI 28 (e.g., in step 134) may include different configurations. In general, the alert is configured to be "gentle" or "whimsical" in nature and not startle or surprise the driver 14.

Figure 4A:
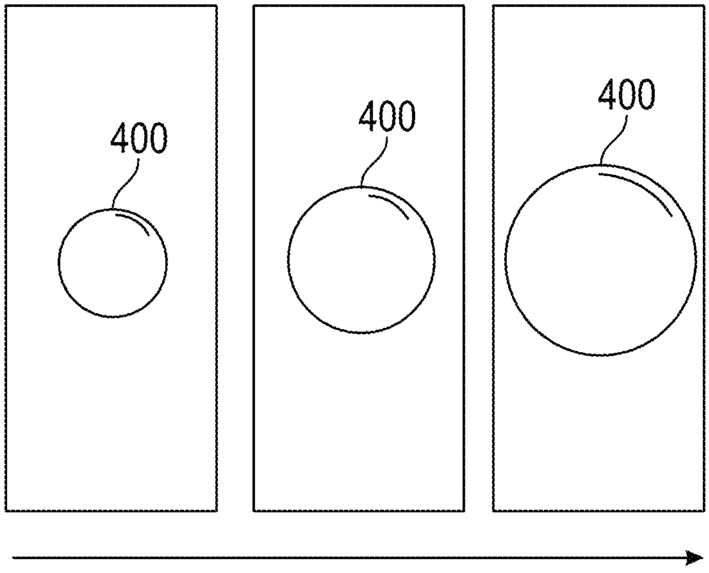
FIGS. 4A through 4B are graphical depictions illustrating an example of an alert displayed on a human machine interface, where the alert includes a bubble that increases in size, in accordance with the present disclosure.
Figure 4B:
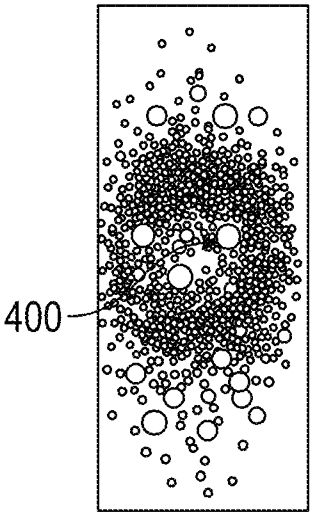

FIGS. 4A and 4B illustrate one example of an alert configured to be displayed on the HMI 28. The alert illustrated in FIG. 4A includes a bubble 400 that progressively (from left to right) increases in size. The bubble 400 is configured to gently or whimsically alert the driver to cognitive distraction as determined by the controller 16. In some instances, and as shown in FIG. 4B, the bubble 400 may disintegrate or slowly fizzle away after having increased in size. The controller 16 and/or HMI 28 may continue to repeat presenting the bubble 400 as it increases in size and/or disintegrates until the controller extinguishes the alert at step 138.

Figure 5:
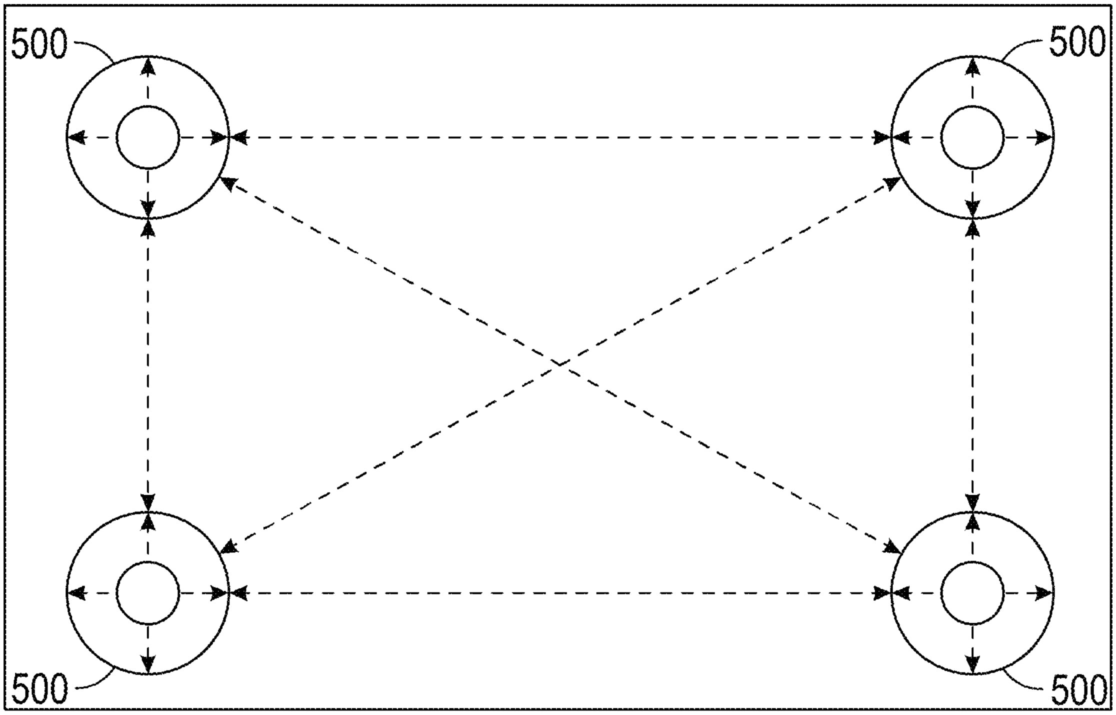
FIG. 5 is a graphical depiction illustrating an example of an alert displayed on a human machine interface, where the alert includes a bubble configured to move across a human machine interface, in accordance with the present disclosure.

FIG. 5 depicts another example of an alert configured to be displayed on the HMI 28. The alert includes a bubble 500 configured to move across the HMI 28. For example, the bubble 500 can move proximate to an edge of a display screen of the HMI 28 and/or can move diagonally or laterally across the HMI 28. In some instances, the bubble 500 may increase and/or decrease in size as the bubble 500 moves.

Figure 6C:
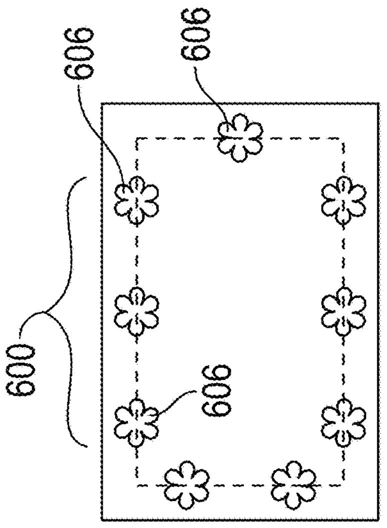
FIGS. 6A through 6C are graphical depictions illustrating an example of an alert displayed on a human machine interface, where the alert includes a changing border, in accordance with the present disclosure.
Figure 6B:
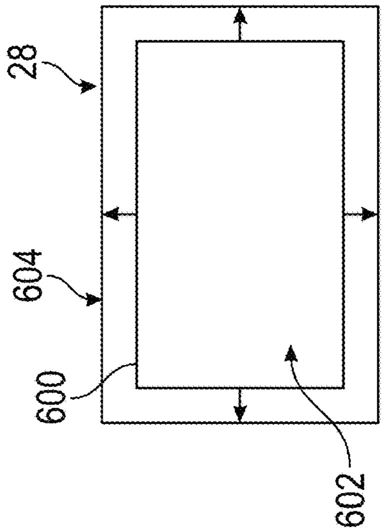
Figure 6A:
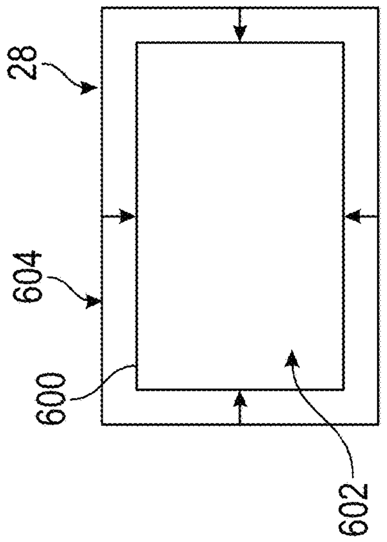

FIGS. 6A through 6C depict another example of an alert configured to be displayed on the HMI 28. In this example, the alert includes a changing border 600. In FIG. 6A, the border 600 is configured to decrease in size and move toward a center 602 of the HMI 28. In FIG. 6B, the border 600 is configured to increase in size and move from the center 602 to an edge 604 of the HMI 28. The border 600 may fluctuate between the configuration illustrated in FIG. 6A and the configuration illustrated in FIG. 6B. Additionally, the border 600 as shown in FIGS. 6A and 6B may be a straight line as shown or may include other configurations (e.g., wavy, the border is a gradient in brightness, intensity, and/or color). FIG. 6C illustrates a border 600 that includes a plurality of bubbles 606 that deflate. It is contemplated that the border 600 may include a variety of objects and configurations that are suitable for alerting the driver 14.

Figure 7D:
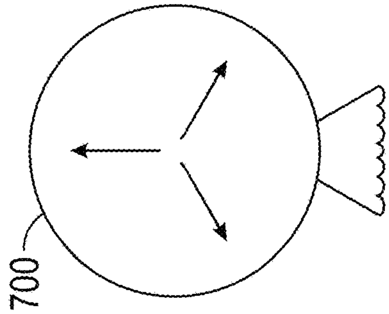
FIGS. 7A through 7D are graphical depictions illustrating an example of an alert displayed on a human machine interface, where the alert includes a bubble that is configured to gradually and unevenly inflate or deflate (e.g., an inflatable element), in accordance with the present disclosure.
Figure 7C:
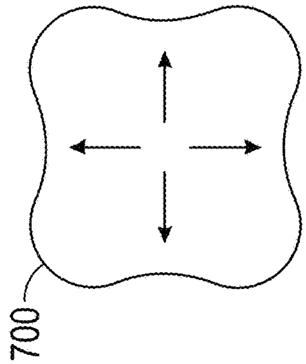
Figure 7B:
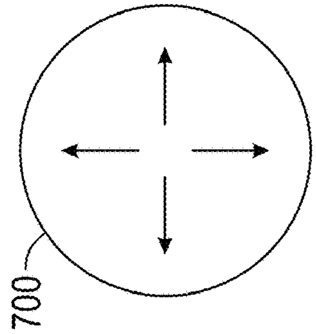
Figure 7A:
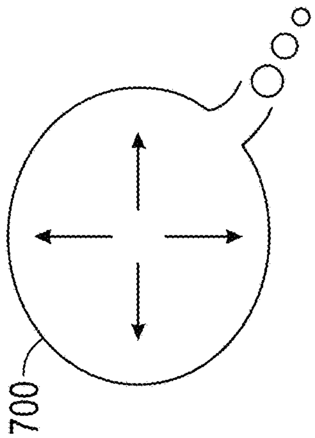

FIGS. 7A through 7D illustrate examples of an alert that includes different configurations of bubbles for display on the HMI 28. FIG. 7A depicts an example of a bubble 700 that is configured to gradually and unevenly inflate and/or deflate, where the bubble 700 appears to be losing air from an edge of the bubble 700. FIG. 7B illustrates an example of the bubble 700 similar to that shown in FIG. 7A but evenly inflates and/or deflates. FIG. 7C illustrates an example of the bubble 700 shown in FIG. 7A that unevenly inflates and deflates but does not appear as losing air. FIG. 7D illustrates an example of a bubble 700 that gradually inflates and/or deflates.

Figure 8A:
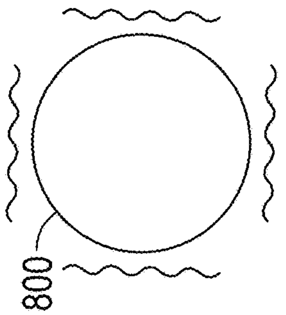
FIGS. 8A through 8C are graphical depictions illustrating an example of an alert displayed on a human machine interface, where the alert includes a bubble that is configured to appear as shaking or vibrating, in accordance with the present disclosure.
Figure 8B:
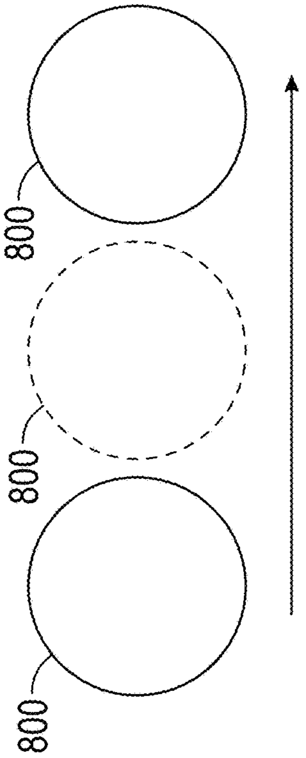
Figure 8C:
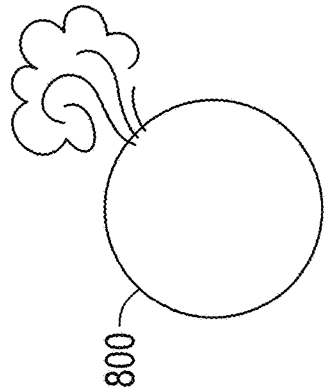

FIGS. 8A through 8C illustrate some additional examples of an alert that include a bubble 800. In the example illustrated in FIG. 8A, the bubble 800 is configured to appear as shaking and/or vibrating on the HMI 28. In the example illustrated in FIG. 8B, the bubble 800 is configured to repeatedly pulse in intensity as illustrated from left to right. In the example illustrated in FIG. 8C, the bubble 800 is configured to appear on the HMI 28 as losing air or steam. In this configuration, the bubble 800 may alternate between losing air or steam and being inflated.

Figure 9A:
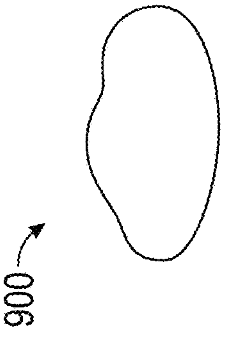
FIGS. 9A through 9C are graphical depictions illustrating an example of an alert displayed on a human machine interface, where the alert includes a bubble that is initially inflated but then deflates and ultimately disappears, in accordance with the present disclosure.
Figure 9B:
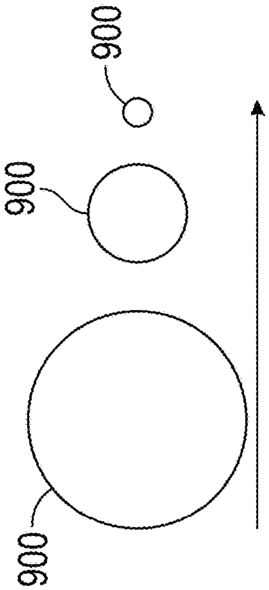
Figure 9C:
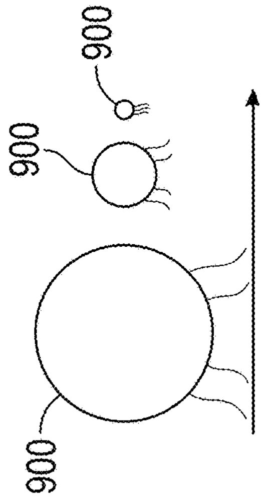

In the examples illustrated in FIGS. 9A through 9B, the alert is configured as appearing to be removed or to disappear. In the example shown in FIG. 9A, the alert is shown as a bubble 900 that is initially inflated but then deflates and ultimately disappears on the HMI 28. In the example depicted in FIG. 9B the alert is shown as a bubble 900 gradually shrinking and decreasing in size until the bubble 900 disappears, as represented from left to right. In the example depicted in FIG. 90, the alert is shown as a bubble 900 that shrinks and decreases in size until the bubble 900 disappears with releasing air or steam shown as the bubble 900 decreases and ultimately disappears. In these configurations, the bubbles 900 may repeatedly appear and disappear until the controller extinguishes the alert at step 138.

Figure 10A:
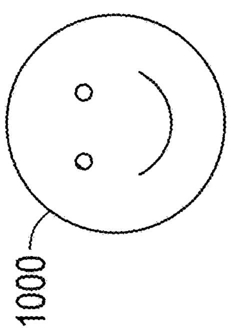
FIGS. 10A through 10C are graphical depictions illustrating an example of an alert displayed on a human machine interface, where the alert includes a representation of a face in various states of expression, in accordance with the present disclosure.
Figure 10B:
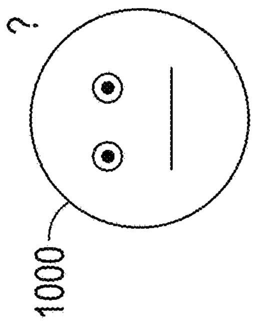
Figure 10C:
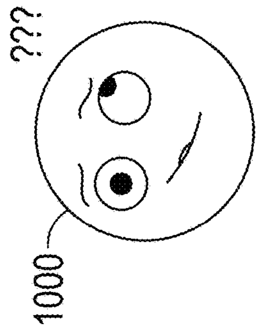

In the examples illustrated in FIGS. 10A through 10C, the alert is configured to be displayed on the HMI 28 as a representation of a face 1000 in various states of expression. In the example illustrated in FIG. 10A, the face 1000 is shown as a smiling face. In the example illustrated in FIG. 10B, the face 1000 is shown with a neutral expression, and in the example illustrated in FIG. 10C, the face 1000 is shown with a distressed expression. It is contemplated that the faces 1000 illustrated in FIGS. 10A through 10C may include other configurations and expressions suitable as an alert for display on the HMI 28.

The system 10 and method 100 of the present disclosure offer several advantages. First, the system 10 and method 100 facilitate alerting a driver 14 of cognitive distraction while driving, of which the driver 14 may not be aware. Second, when providing an alert of cognitive distraction, the system 10 and method 100 provide a "gentle" or "whimsical" alert to the driver 14, thus avoiding startling or surprising the driver 14.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A cognitive distraction detection system for a driver of a vehicle, comprising:

a camera;

a human machine interface (HMI); and a controller in electrical communication with the camera and the human machine interface (HMI), the controller including a processor and a memory, the memory including instructions such that the processor is programmed to:

receive from the driver a cognitive distraction threshold preference;

determine whether physical traits of the driver indicate cognitive distraction at least partially based on the cognitive distraction threshold preference;

determine whether physiological traits of the driver indicate cognitive distraction at least partially based on the at least one cognitive distraction threshold preference;

receive an indication of at least one vehicle dynamic of the vehicle;

determine whether driving behavior indicates cognitive distraction of the driver;

determine a driver cognitive distraction level based on at least the physical traits, the physiological traits, and the driving behavior;

send an indication of the driver cognitive distraction to a human machine interface (HMI) of the vehicle using the controller when driver cognitive distraction has been determined; and create an alert to the driver using the human machine interface (HMI).

2. The cognitive distraction detection system in claim 1, wherein the at least one cognitive distraction threshold preference includes at least one of frequency of an amount of lane line touches, an amount of time being tailgated, an amount of time maintaining a speed lower than surrounding traffic, or an amount of low distribution of eye gaze patterns.

3. The cognitive distraction detection system in claim 1, wherein the at least one vehicle dynamic includes at least one of vehicle speed, vehicle acceleration, a braking pattern, or a vehicle steering pattern.

4. The cognitive distraction detection system in claim 1, wherein the alert includes an inflatable element on at least one of a head up display, an instrument cluster, an infotainment system, or a passenger display.

5. The cognitive distraction detection system in claim 1, wherein the alert includes an inflatable element that is a bubble that gradually increases in size.

6. The cognitive distraction detection system in claim 1, wherein the alert includes at least one of an audio or a haptic alert that accompanies an inflatable element.

7. A method for detecting and mitigating cognitive distraction of a driver of a vehicle, comprising:

receiving from a driver, using a controller, a cognitive distraction threshold preference;

determining, using the controller, whether at least one physical trait of the driver indicates cognitive distraction at least partially based on the cognitive distraction threshold preference;

determining, using the controller, whether at least one physiological trait of the driver indicates cognitive distraction at least partially based on the at least one cognitive distraction threshold preference;

receiving an indication of at least one vehicle dynamic of the vehicle;

determining whether driving behavior suggests cognitive distraction of the driver;

determining a driver cognitive distraction level based on at least the physical traits, the physiological traits, and the driving behavior;

sending an indication of the driver cognitive distraction to a human machine interface of the vehicle using the controller when driver cognitive distraction has been determined; and creating an alert to the driver using the human machine interface.

8. The method of claim 7, wherein the at least one cognitive distraction threshold preference includes at least one of frequency of an amount of lane line touches, an amount of time being tailgated, an amount of time maintaining a speed lower than surrounding traffic, or an amount of low distribution of eye gaze patterns.

9. The method of claim 7, wherein the at least one vehicle dynamic includes at least one of vehicle speed, vehicle acceleration, a braking pattern, or a vehicle steering pattern.

10. The method of claim 7, wherein the at least one vehicle dynamic includes an Advanced Driver Assistance Systems (ADAS) measurement.

11. The method of claim 7, wherein the alert includes at least one of an audio or a haptic alert.

12. The method of claim 7, wherein determining a driver cognitive distraction level includes:

receiving driver and vehicle information;

determining a cognitive distraction characteristic based at least partially on at least one of the physical traits, the physiological traits, or the vehicle dynamics;

determining whether the cognitive distraction characteristic exceeds the cognitive distraction threshold preference;

when the cognitive distraction characteristic exceeds the cognitive distraction threshold preference, determining a variable weighting factor for the cognitive distraction characteristic;

assigning a cognitive distraction score to the cognitive distraction characteristic; and presenting the cognitive distraction score to the controller.

13. The method of claim 12, wherein the cognitive distraction characteristic includes at least one of a frequency of lane line touches, a time being tailgated, a time maintaining a speed lower than surrounding traffic, or a low distribution of eye gaze patterns.

14. The method of claim 12, wherein determining a variable weighting factor includes using a lookup table.

15. The method of claim 7, wherein creating the alert to the driver using the human machine interface includes creating an inflatable element on at least one of a heads-up display, an instrument cluster, an infotainment system, or a passenger display.

16. The method of claim 15, wherein the inflatable element includes a bubble that gradually increases in size.

17. The method of claim 15, wherein creating the inflatable element includes providing at least one of an audio or a haptic alert that accompanies the inflatable element.

18. The method of claim 7, wherein creating the alert to the driver includes creating an inflatable element that changes as cognitive distraction time increases.

19. The method of claim 18, wherein the inflatable element at least one of increases in size, increases in number of inflatable elements, moves from an edge to a center of the human machine interface (HMI), or shakes and pulses.

20. A system for detecting cognitive distraction of a driver of a vehicle, comprising:

a camera;

a biometric sensor;

a human machine interface; and a controller in electrical communication with the camera, the biometric sensor, and the human machine interface, the controller including a processor and a memory, the memory including instructions such that the processor is programmed to:

receive from a driver a cognitive distraction threshold preference;

determine whether physical traits of the driver indicate cognitive distraction at least partially based on the cognitive distraction threshold preference;

determine whether physiological traits of the driver indicate cognitive distraction at least partially based on the at least one cognitive distraction threshold preference;

receive an indication of at least one vehicle dynamic of the vehicle;

determine whether driving behavior indicates cognitive distraction of the driver;

determine a driver cognitive distraction level based on at least the physical traits, the physiological traits, and the driving behavior;

send an indication of the driver cognitive distraction to a human machine interface of the vehicle using the controller when driver cognitive distraction has been determined; and create an alert to the driver using the human machine interface, wherein the alert includes an inflatable element.

* * * * *